May 11, 1937. E. W. MITCHEL 2,079,917
NUT SECURING DEVICE
Filed Jan. 2, 1937
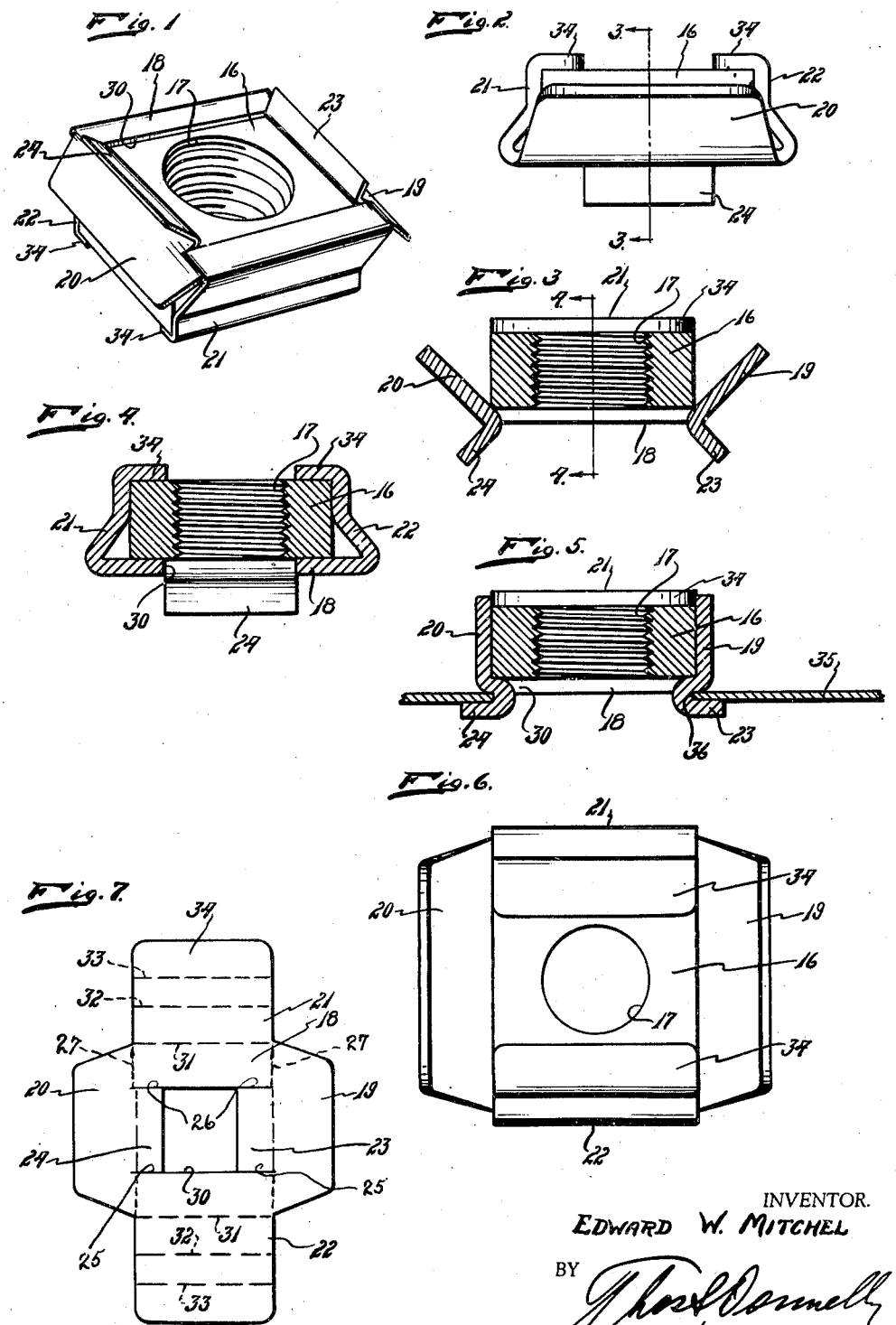
INVENTOR.
EDWARD W. MITCHEL
BY
ATTORNEY.

Patented May 11, 1937

2,079,917

UNITED STATES PATENT OFFICE 2,079,917

NUT SECURING DEVICE

Edward W. Mitchel, Detroit, Mich.

Application January 2, 1937, Serial No. 118,803

7 Claims. (Cl. 85—32)

My invention relates to a new and useful improvement in a nut securing device adapted for securing a nut in position on a panel or other suitable supporting bodies over an opening formed therein so that the nut may be held stationary while a screw or bolt is threaded thereinto.

It is an object of the present invention to provide a nut securing device of this class which is simple in structure, durable, light, economical of manufacture and easily and quickly applied in position.

Another object of the invention is the provision of a device of this class with a pair of retaining hooks so arranged that upon bending a part of the body, the hooks will be moved further apart so as to clamp against the edges of the opening formed in the supporting body and through which the hooks are projected.

Another object of the invention is the provision of a nut securing device of this class so constructed that the bendable parts may be bent into engagement with the nut and at the same time securely and permanently lock the securing device in fixed relation on the supporting body.

Other objects will appear hereinafter.

The invention consists in the combination and arrangement of parts hereinafter described and claimed.

The invention will be best understood by a reference to the accompanying drawing which forms a part of this specification and in which, Fig. 1 is a perspective view of the invention.

Fig. 2 is a side elevational view of the invention.

Fig. 3 is a sectional view taken on line 3—3 of Fig. 2.

Fig. 4 is a sectional view taken on line 4—4 of Fig. 3.

Fig. 5 is a sectional view similar to Fig. 3, showing the invention mounted on a supporting body and the bendable flaps bent into hook locking position.

Fig. 6 is a top plan view of the invention.

Fig. 7 is a plan view of the blank used in the invention.

As shown in the drawing, the invention is used to retain a nut 16 in position so that a bolt may be threaded into the threaded bore or opening 17 of the nut. The retainer is formed from a single blank of sheet metal and is provided with a main body 18 which, when the device is formed, constitutes the back of the structure. The side flaps 19 and 20 are formed on this main body at opposite sides thereof and end flaps 21 and 22 are formed on this body at opposite sides thereof. Tongues are punched from the back portion 18 and bent outwardly to form hooks 23 and 24. The back 18 is slit at the tongues along the lines 25 and 26, this slit extending to the line 27 of the bend of the side flaps 19 and 20. When the tongues are bent outwardly, there is thus provided a central opening 30 in the back, over which the nut 16 is positioned to lie with its opening 17 in registration with the opening 30. The end flaps are bent upwardly on the line of bend 31 and thence inwardly and then again bent on the line of bend 32 to lie in engagement with the opposite faces of the nut 16 as shown in Fig. 4. These flaps are again bent on the line of bend 33 to provide the tongue 34 which serves to clamp the front face to the nut so as to press the nut against the back 18 and retain it thereagainst in clamping relation. The side flaps 19 and 20 are bent to normally extend at an inclination to the plane of the back 18. The supporting body 35 is provided with an opening 36 at which the nut is to be located. In order to attach the retainer in position on the supporting body 35, the hooks or tongues 23 and 24 are projected through the opening 36 so that the back 18 will lie in engagement with one face of the supporting body 35. By means of a pair of pliers or a similar tool, the flaps 19 and 20 are then bent so as to extend substantially at right angles to the plane of the supporting body 35 so as to engage the side faces of the nut or so as to lie in the position shown in Fig. 5. Since the slits 25 extend outwardly to the line of bend 27, the bending of the side flaps 19 and 20 toward the position at which they would extend vertically to the supporting body 35 affects a spreading apart of the hooks or tongues 23 and 24 so as to clench these tongues or hooks against the opposite face of the supporting body as shown in Fig. 5. It will be noted that the flaps 19 and 20 are accessible for bending from the same side of the supporting body 35 on which lies the retainer.

With a nut securing device constructed in this manner, a very simple operation is required to secure the device firmly in position on the panel on which it is used. The metal is made of sufficiently stiff body as to resist any attempt of the metal itself to bend the flaps 19 and 20 outwardly after they are moved to their locking or clamping position as shown in Fig. 5.

While I have illustrated and described the preferred form of construction, I do not wish to limit myself to the precise details of structure shown, but desire to avail myself of such variations and modifications as may come within the scope of the appended claims.

Having thus described my invention, what I claim as new and desire to secure by Letters Patent is:

1. A device of the class described, comprising: a nut supporting cage having an opening formed therein; a nut mounted fixedly in said cage with its opening in registration with the opening in said cage; a pair of tongues mounted on said cage and projecting outwardly from the back thereof; and means on said cage projecting forwardly from the back thereof for effecting a further spreading apart of said tongues.

2. A device of the class described, comprising: a nut supporting body having a back and having an opening formed therein; a nut fixedly mounted on said body with its opening in registration with the opening in said back; a pair of spaced hooks on said body and projecting rearwardly from the back thereof; and means on said body projecting forwardly from the back thereof for spreading said hooks further apart.

3. A device of the class described, comprising: a nut retaining body having a back and provided with an opening in its back; a nut fixedly mounted on said body with its opening in registration with the opening in said back; a pair of spaced hooks mounted on said body and projecting rearwardly from said back; and bendable means on said body and projecting forwardly from said back and adapted upon being bent in one direction for spreading said hooks farther apart.

4. A nut securing device of the class described, comprising: a nut retaining body having a back; a pair of tongues struck from said back, each of said tongues being angularly turned intermediate its ends outwardly from the other to provide a pair of spaced hooks and form a central opening in said back; a nut mounted on said body with its opening in registration with the opening in said back; side flaps on said back normally inclined thereto and adapted upon being bent perpendicularly relatively to said back, for spreading said hooks farther apart.

5. A nut securing device of the class described, comprising: a nut retaining body having a back; a pair of tongues struck from said back, each of said tongues being angularly turned intermediate its ends outwardly from the other to provide a pair of spaced hooks and form a central opening in said back; a nut mounted on said body with its opening in registration with the opening in said back; side flaps on said back normally inclined thereto and adapted upon being bent perpendicularly relatively to said back, for spreading said hooks farther apart, said tongues being slitted outwardly in said back to the bending line of said flaps.

6. A nut securing device of the class described, comprising: a retaining body having a back; tongues struck from said back and turned outwardly from each other toward opposite edges of said back; bendable flaps on said opposite edges of said back adapted upon being bent toward a plane extending perpendicularly to said back to move said tongues farther apart; and side flaps on said back bendable inwardly thereof for clamping a nut against said back and retaining the opening in said nut in registration with an opening formed in said back.

7. A nut securing device of the class described, comprising: a nut retainer having a back; tongues punched from said back and bent outwardly from opposite edges thereof to provide hooks; said back having an opening formed at the space from which said tongues are punched; a nut positioned on said back having its opening in registration with the opening in said back; bendable flaps on said opposite edges of said back being adapted upon being bent toward a plane extended perpendicularly to said back to move said hooks outwardly of each other; side flaps on said back, said back between said side flaps being of greater width than said nut and said side flaps being bent inwardly of said back for a portion of their length and thence extended in engagement with the opposite faces of said nut and upset at their ends to engage a portion of said nut for clamping said nut against said back.

EDWARD W. MITCHEL.